(12) United States Patent
Miyako et al.

(10) Patent No.: US 7,217,894 B2
(45) Date of Patent: May 15, 2007

(54) SWITCH APPARATUS FOR USE IN VEHICLES

(75) Inventors: Mamoru Miyako, Aichi (JP); Kazuki Yamaguchi, Aichi (JP); Takayuki Washino, Aichi (JP); Shinichi Umemura, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 11/016,625

(22) Filed: Dec. 17, 2004

(65) Prior Publication Data
US 2005/0098417 A1    May 12, 2005

(30) Foreign Application Priority Data
Jun. 20, 2003  (JP) ............................. 2003-177184
Sep. 30, 2004  (JP) ............................. 2004-287620

(51) Int. Cl.
*H01H 9/00*   (2006.01)
(52) U.S. Cl. ..................................... 200/61.54; 200/313
(58) Field of Classification Search .. 200/61.54–61.57, 200/61.27–61.38, 308–317, 5 A, 5 R
See application file for complete search history.

(56) References Cited
U.S. PATENT DOCUMENTS

| 4,518,836 | A | * | 5/1985 | Wooldridge | ............. | 200/61.54 |
|---|---|---|---|---|---|---|
| 5,569,893 | A | * | 10/1996 | Seymour | .................. | 200/61.54 |
| 5,584,381 | A | * | 12/1996 | Brundage et al. | ........... | 200/315 |
| 6,183,005 | B1 | * | 2/2001 | Nishijima et al. | .......... | 280/731 |
| 6,196,738 | B1 | * | 3/2001 | Shimizu et al. | ............. | 200/314 |
| 6,349,616 | B1 | * | 2/2002 | Onodera et al. | ......... | 200/61.54 |
| 6,548,772 | B2 | * | 4/2003 | Liburdi | .................... | 200/61.54 |
| 6,624,365 | B2 | * | 9/2003 | Miyako et al. | .......... | 200/61.54 |
| 6,768,067 | B2 | * | 7/2004 | Adachi et al. | ............ | 200/61.54 |

FOREIGN PATENT DOCUMENTS

| GB | 2344905 | 6/2000 |
|---|---|---|
| JP | 2002-50801 | 2/2002 |
| JP | 2002-166832 | 6/2002 |
| JP | 2003-118416 | 4/2003 |
| JP | 2003-143741 | 5/2003 |
| JP | 2004-149086 | 5/2004 |

* cited by examiner

*Primary Examiner*—Elvin Enad
*Assistant Examiner*—M. Fishman
(74) *Attorney, Agent, or Firm*—Synnestvedt & Lechner LLP

(57) ABSTRACT

A vehicle switch apparatus for increasing space for other switches and ensuring operation of a switch when the switch must be felt for in order to be operated. The vehicle switch apparatus includes a paddle that has a front surface facing the driver and a rear surface opposite to the front surface. A push switch is arranged near the rear surface of the paddle and includes an operation portion operated by the driver. The paddle has a window for enabling the driver to visually check operation of the operation portion.

2 Claims, 12 Drawing Sheets

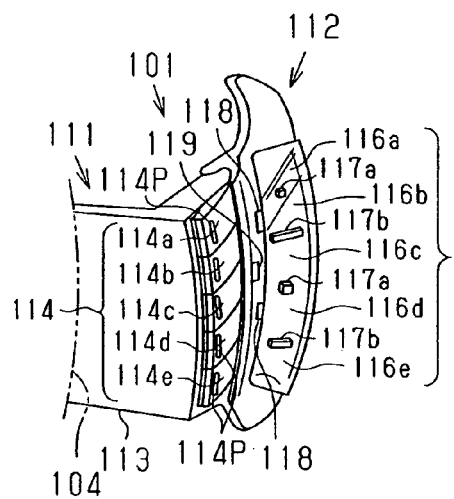
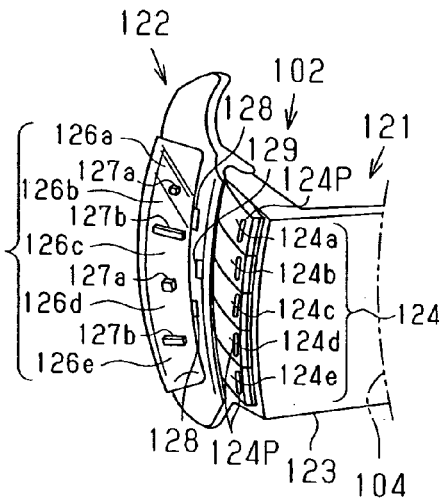
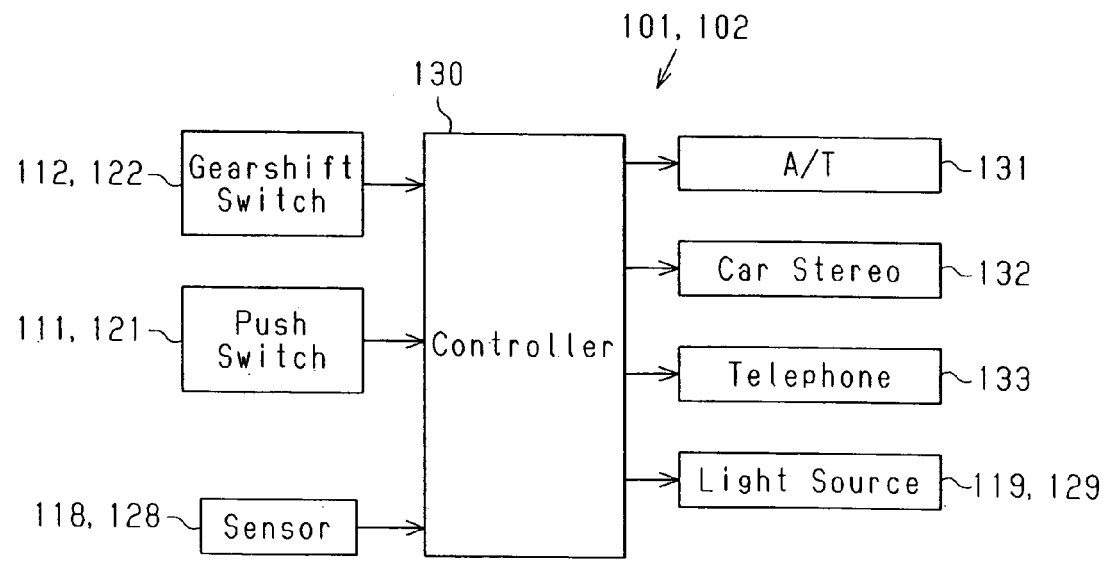

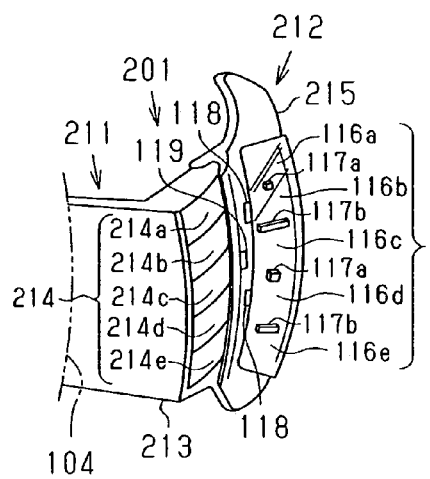
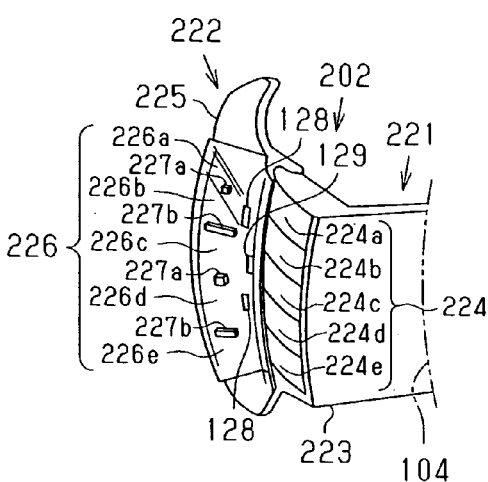
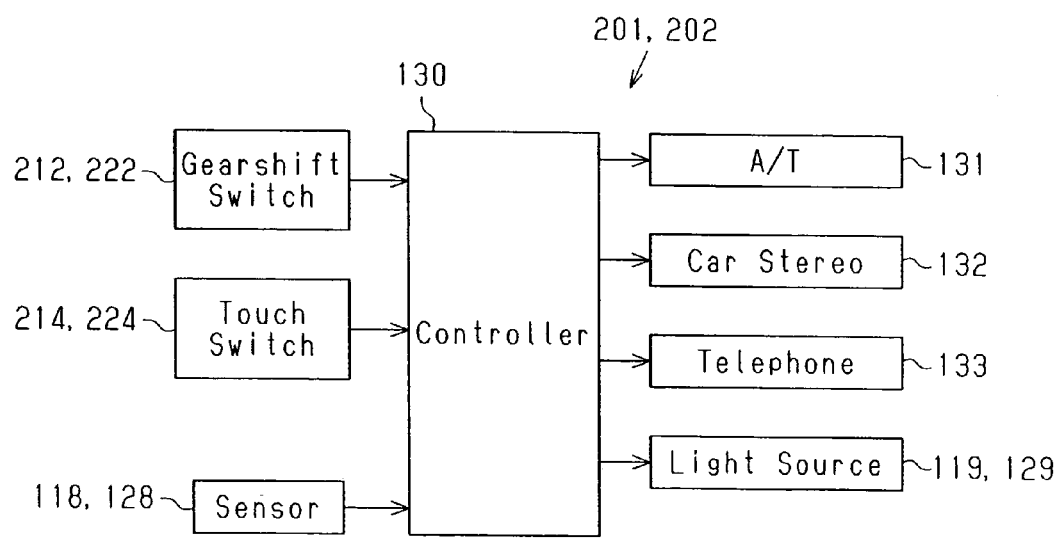

SWITCH APPARATUS FOR USE IN VEHICLES

BACKGROUND OF THE INVENTION

The present invention relates to a switch apparatus for use in vehicles.

To achieve high operation stability during driving of an automobile, it is preferable that the driver always looks in the travel direction of the automobile. In view of this, switch apparatuses for vehicles that are touch-operated have been proposed (refer, for example, to Japanese Laid-Open Patent Publication Nos. 2004-149086, 2003-143741, 2003-118416, 2002-166832, and 2002-50801). Such a switch apparatus enables the driver to feel for the desired switch. However, when the driver is not familiar with the characteristics of a switch apparatus that he or she operates, or when the driver operates a switch that he or she uses infrequently, the driver may not be confident of touch-operation. When operating a switch in such a case, the driver visually checks the position of the switch. Thus, it is preferable that switches are positioned relatively close to the driver's line of eye sight during driving to improve operability. For example, switches may be arranged on the periphery of the steering wheel. This enables the driver to operate many kinds of switches, arranged on the periphery of the steering wheel, while driving the automobile without greatly moving the driver's line of eye sight.

As an apparatus including switches other than the vehicle switches, UK Patent No. 2344905 discloses a personal digital assistance (PDA) including switches on its rear side. The PDA includes a touch screen (switches) on its rear side and a transparent screen display on its front side. The transparent screen display enables the touch screen to be viewed from the front side of the PDA.

On the periphery of the steering wheel, combination switches are arranged at the left and right sides of the steering column. A space for expansion of an air bag must be provided in front of the steering wheel. Thus, the periphery of the steering wheel has limited space for arranging additional switches. An additional switch may be arranged on the rear side of the steering wheel or of the combination switches. Such locations are blind spots for the driver. In such cases, the driver is able to easily operate the switches but is not able to visually check the position of the switches. This does not improve the operation reliability of the switches, or ensure the operating of the switches. Thus, locations for the switches are limited.

The structure of the apparatus disclosed in UK patent No. 2344905 may be applied to the vehicle switch apparatus. However, the disclosed apparatus uses a touch screen and a screen display, which results in relatively high costs.

SUMMARY OF THE INVENTION

The present invention provides a switch apparatus for vehicles, which improves the operation reliability of a switch included therein that the driver has to feel for to operate, and increases space for arranging other switches at a low cost.

One aspect of the present invention is a switch apparatus for use in a vehicle by an operator. The switch apparatus includes a cover having a front surface facing the operator and a rear surface opposite to the front surface. A push switch including an operation portion is located on or near the rear surface of the cover and operated by the operator. A viewer is arranged on the cover for enabling the operator to visually check operation of the operation portion.

Another aspect of the present invention is a switch apparatus for use in a vehicle by an operator. The switch apparatus includes a cover having a front surface facing the operator and a rear surface opposite to the front surface. A lever switch includes a lever that is arranged near the rear surface of the cover and operated by the operator. A viewer is arranged on the cover for enabling the operator to visually check operation of the lever.

A further aspect of the present invention is a switch apparatus for use in a vehicle by an operator. The switch apparatus includes a cover having a front surface facing the operator and a rear surface opposite to the front surface. A touch switch is arranged on or near the rear surface of the cover and operated by the operator. A viewer is arranged on the cover for enabling the operator to visually check operation of the touch switch.

Another aspect of the present invention is a switch apparatus for a use in a vehicle, including a column, by an operator. The switch apparatus includes a support supported on the column. A switch is arranged on the support and operated by the operator. A paddle is fixed to the support near the switch. A viewer is arranged on the paddle for enabling the operator to visually check operation of the switch.

A further aspect of the present invention is a switch apparatus for use in a vehicle, including a column, by an operator. The switch apparatus includes a support supported on the column. A switch is arranged on the support and operated by the operator. A paddle is fixed to the support near the switch. A transparent or translucent window is arranged on the paddle.

Another aspect of the present invention is a switch apparatus for use in a vehicle, including a vehicle component having a recess, by an operator. The switch apparatus includes a cover attached to the recess and having a front surface facing the operator and a rear surface opposite to the front surface. A switch is arranged on the rear surface of the cover and operated by the operator. A viewer is arranged on the cover for enabling the operator to visually check operation of the switch.

A further aspect of the present invention is a switch apparatus for use in a vehicle, including a vehicle component having a recess, by an operator. The switch apparatus includes a cover having a front surface facing the operator and a rear surface opposite to the front surface. A switch is arranged on the rear surface of the cover and operated by the operator. A transparent or translucent window is arranged on the cover.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3A is a rear view of the vehicle switch apparatus of FIG. 2A, and FIG. 3B is a rear view of the vehicle switch apparatus of FIG. 2B;

FIG. 4 is a block diagram of the vehicle switch apparatuses shown in FIG. 1;

FIG. 11A is a rear view of the vehicle switch apparatus of FIG. 10A, and FIG. 11B is a rear view of the vehicle switch apparatus of FIG. 10B;

FIG. 12 is a block diagram of the vehicle switch apparatuses shown in FIG. 9;

DETAILED DESCRIPTION OF THE PREFERRED EMBODIMENTS

Figure 1:
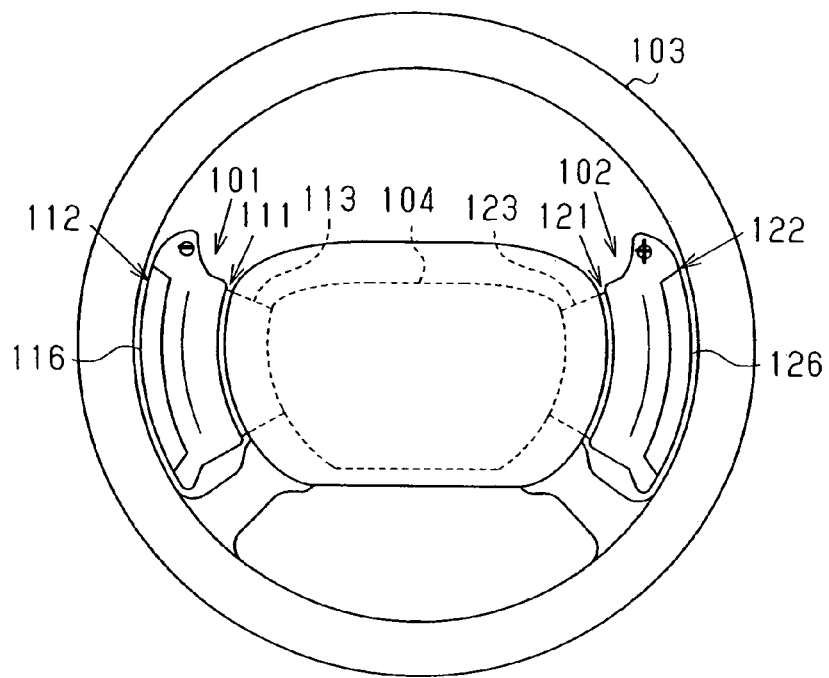
FIG. 1 is a front view showing vehicle switch apparatuses according to a first embodiment of the present invention.

In the drawings, like numerals are used for like elements throughout.

[First Embodiment]

Vehicle switch apparatuses 101 and 102 according to a first embodiment of the present invention will now be described with reference to FIGS. 1 to 5. As shown in FIG. 1, the vehicle switch apparatus 101 is arranged on the left side of a column 104 of a steering wheel 103, and the vehicle switch apparatus 102 is arranged on the right side of the column 104. The vehicle switch apparatuses 101 and 102 are hereafter simply referred to as the switch apparatuses 101 and 102. Control levers for a turn signal switch, a front light switch, a wiper switch, etc. are arranged on the left and right sides of the column 104 but are not shown in the drawing.

[Switch Apparatus 101]

As shown in FIG. 1, the switch apparatus 101 includes a gearshift down switch 112 and a push switch 111. The gearshift down switch 112 has a window 116, which functions as a viewer.

Figure 2A:
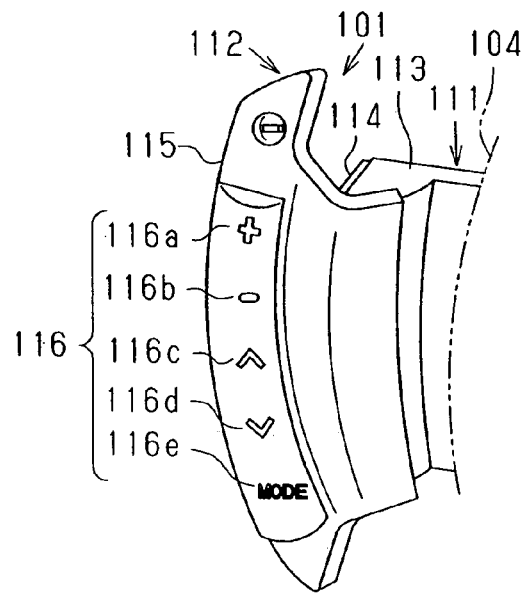
FIG. 2A is an enlarged perspective view of the vehicle switch apparatus shown in the left portion of FIG. 1.

As shown in FIG. 2A, the gearshift down switch 112 includes a main body 113 (support), which is supported on the base of the column 104. The gearshift down switch 112 includes a paddle 115 (cover), which is fixed to the main body 113. The symbol "−" is marked at the top portion of the paddle 115. The window 116 is arranged on the paddle 115. The paddle 115 has a front surface facing the driver and a rear surface opposite to the front surface. The main body 113 is tiltable in front and rear directions. This structure enables the paddle 115 to be pushed toward the driver (operator) while the driver is gripping the steering wheel 103 in order to shift the transmission to a lower gear.

The push switch 111 includes an operation portion 114, which is arranged rearward from the paddle 115, that is, near the rear surface of the paddle 115. The operation portion 114 is pressed in a direction intersecting the direction in which the gearshift down switch 112 is operated (the direction in which the paddle 115 is tilted). As shown in FIG. 3A, the operation portion 114 includes a first operation portion 114a, a second operation portion 114b, a third operation portion 114c, a fourth operation portion 114d, and a fifth operation portion 114e. The first to fifth operation portions 114a to 114e are arranged in parallel with one another in the stated order from the upper side of the operation portion 114. As shown in FIG. 3A, a protrusion 114p is arranged on the top of each of the first to fifth operation portions 114a to 114e. The driver (operator) touches the protrusions 114p with his or her finger to select the first to fifth operation portions 114a to 114e without viewing the operation portions 114a to 114e.

The window 116 of the paddle 115 is located at the outer side of the operation portion 114 of the push switch 111 in correspondence with where fingers would be extended across to operate the operation portion 114. The window 116 is made of glass or synthetic resin, which has a light transmission property. As shown in FIG. 3A, two short partitions 117a and two long partitions 117b are alternately arranged on the rear side of the window 116. The short partitions 117a and the long partitions 117b divide the window 116 into a first window section 116a, a second window section 116b, a third window section 116c, a fourth window section 116d, and a fifth window section 116e in the stated order from the upper side of the window 116. The first to fifth window sections 116a to 116e are arranged to correspond to the first to fifth operation portions 114a to 114e, respectively.

The first to fifth window sections 116a to 116e have printed or painted characters or symbols indicating the functions of the first to fifth operation portions 114a to 114e. The symbol "+" is marked on the first window section 116a. The first operation portion 114a is for increasing the volume of the car stereo. The symbol "−" is marked on the second window 116b. The second operation portion 114b is for decreasing the volume of the car stereo. The symbol "Λ" is marked on the third window section 116c. The third operation portion 114c is for selecting a song on a music CD or a radio channel in one direction. The symbol "V" is marked on the fourth window section 116d. The fourth operation portion 114d is for selecting a song on a music CD or a radio channel in a direction opposite to the selection direction of the third operation portion 114c. The characters "MODE" are marked on the fifth window section 116e. The fifth operation portion 114e is for selecting a mode, such as radio or music CD.

A sensor 118 is arranged between the second operation portion 114b and the second window section 116b, and between the fourth operation portion 114d and the fourth window section 116d. The sensor 118 outputs an ON signal when a finger approaches the sensor 118 to operate the operation portion 114. A light source 119 is arranged between the third operation portion 114c and the third window section 116c to illuminate the window 116 from the rear side.

[Switch Apparatus 102]

As shown in FIG. 1, the switch apparatus 102 includes a push switch 121 and a gearshift up switch 122. The gearshift up switch 122 has a window 126, which functions as a viewer.

Figure 2B:
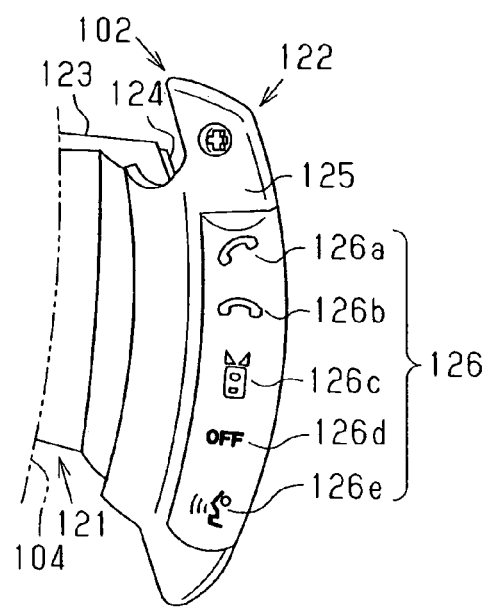
FIG. 2B is an enlarged perspective view of the vehicle switch apparatus shown in the right portion of FIG. 1.

As shown in FIG. 2B, the gearshift up switch 122 includes a main body 123, which is supported on the base of the column 104. The gearshift up switch 122 includes a paddle 125 (cover), which is fixed to the main body 123. The symbol "+" is marked on the top portion of the paddle 125. A window 126 is arranged on the paddle 125. The paddle 125 has a front surface facing the driver, and a rear surface opposite to the front surface. The main body 123 is tiltable in front and rear directions. This structure enables the paddle 125 to be pushed toward the driver while the driver is gripping the steering wheel 103 in order to shift the transmission to a higher gear.

The push switch 121 includes an operation portion 124, which is arranged rearward from the paddle 125, that is, near the rear surface of the paddle 125. The operation portion 124 is pressed in a direction intersecting the direction in which the gearshift up switch 122 is operated (the direction in which the paddle 125 is tilted). As shown in FIG. 3B, the operation portion 124 includes a first operation portion 124a, a second operation portion 124b, a third operation portion 124c, a fourth operation portion 124d, and a fifth operation portion 124e. The first to fifth operation portions 124a to 124e are arranged in parallel with one another in the stated order from the upper side of the operation portion 124. As shown in FIG. 3B, a protrusion 124p is arranged on the top of each of the first to fifth operation portions 124a to 124e. The driver (operator) touches the protrusions 124p with his or her finger to select the first to fifth operation portions 124a to 124e without viewing the operation portions 124a to 124e.

The window 126 of the paddle 125 is located at the outer side of the operation portion 124 of the push switch 121 in correspondence with where fingers would be extended across to operate the operation portion 124. The window 126 is made of glass or a synthetic resin having a light transmission property. As shown in FIG. 3B, two short partitions 127a and two long partitions 127b are alternately arranged on the rear side of the window 126. The short partitions 127a and the long partitions 127b divide the window 126 into a first window section 126a, a second window section 126b, a third window section 126c, a fourth window section 126d, and a fifth window section 126e in the stated order from the upper side of the window 126. The first to fifth window sections 126a to 126e are arranged to correspond to the first to fifth operation portions 124a to 124e, respectively.

The first to fifth window sections 126a to 126e have printed or painted characters or symbols, which indicate the functions of the first to fifth operation portions 124a to 124e. The symbol for a telephone off the hook is marked on the first window section 126a. The first operation portion 124a is for initiating a call with a telephone installed in the vehicle. The symbol for a telephone oh the hook is marked on the second window section 126b. The second operation portion 124b is for terminating a telephone call. A collision warning symbol is marked on the third window section 126c. The third operation portion 124c is for activating a vehicle crash monitoring system. The characters "OFF" are marked on the fourth window section 126d. The fourth operation portion 124d is for deactivating the vehicle crash monitoring system. The symbol of a talking person is marked on the fifth window section 126e. The fifth operation portion 124e is for activating a vehicle voice recognition apparatus.

A sensor 128 is arranged between the second operation portion 124b and the second window section 126b, and between the fourth operation portion 124d and the fourth window section 126d. The sensor 128 outputs an ON signal when a finger approaches the sensor 128 to operate the operation portion 124. A light source 129 is arranged between the third operation portion 124c and the third window section 126c to illuminate the window 126 from the rear side.

[Controller 130]

As shown in FIG. 4, a controller 130 is electrically connected to the gearshift down switch 112 and the gearshift up switch 122 and to the push switches 111 and 121. The switches 111, 112, 121, and 122 provide the controller 130 with an operation signal. The sensors 118 and 128 are connected to the controller 130 and provide the controller 130 with an ON signal (detection signal). The controller 130 is electrically connected to an automatic transmission (A/T) 131, a car stereo 132, and a telephone 133, which are installed in the automobile, and to the light sources 119 and 129, which are included in the switch apparatuses 101 and 102.

The controller 130 includes a plurality of driving circuits for driving the A/T 131, the car stereo 132, the telephone 133, and the light sources 119 and 129. The controller 130 provides each driving circuit with a control signal according to an operation signal and an ON signal provided from the gearshift down switch 112, the gearshift up switch 122, the push switches 111 and 121, and the sensors 118 and 128. Each driving circuit drives the corresponding A/T 131, the car stereo 132, the telephone 133, or the light sources 119 and 129 according to a control signal.

[Operation of the First Embodiment]

The operation of the switch apparatuses 101 and 102 will now be described.

In FIG. 1, the driver pushes the paddle 115 of the gearshift down switch 112 (switch apparatus 101) toward himself or herself while gripping the steering wheel 103. This tilts the main body 113 toward the driver. Then, the gearshift down switch 112 provides the controller 130 with a signal instructing the transmission gear to be lowered (refer to FIG. 4). The controller 130 controls the A/T 131 to execute a gearshift down operation. The driver pushes the paddle 125 of the gearshift up switch 122 (switch apparatus 102) toward himself or herself while gripping the steering wheel 103. This tilts the main body 123 toward the driver. Then, the gearshift up switch 122 provides the controller 130 with a signal instructing the transmission gear to be raised (refer to FIG. 4). The controller 130 controls the A/T 131 to execute a gearshift up operation.

To operate the first to fifth operation portions 114a to 114e or 124a to 124e of the push switch 111 or 121 (refer to FIGS. 3A and 3B), the driver extends his or her fingers to the rear side of the window 116 or 126 of the paddle 115 or 125 while gripping the steering wheel 103.

Figure 5:
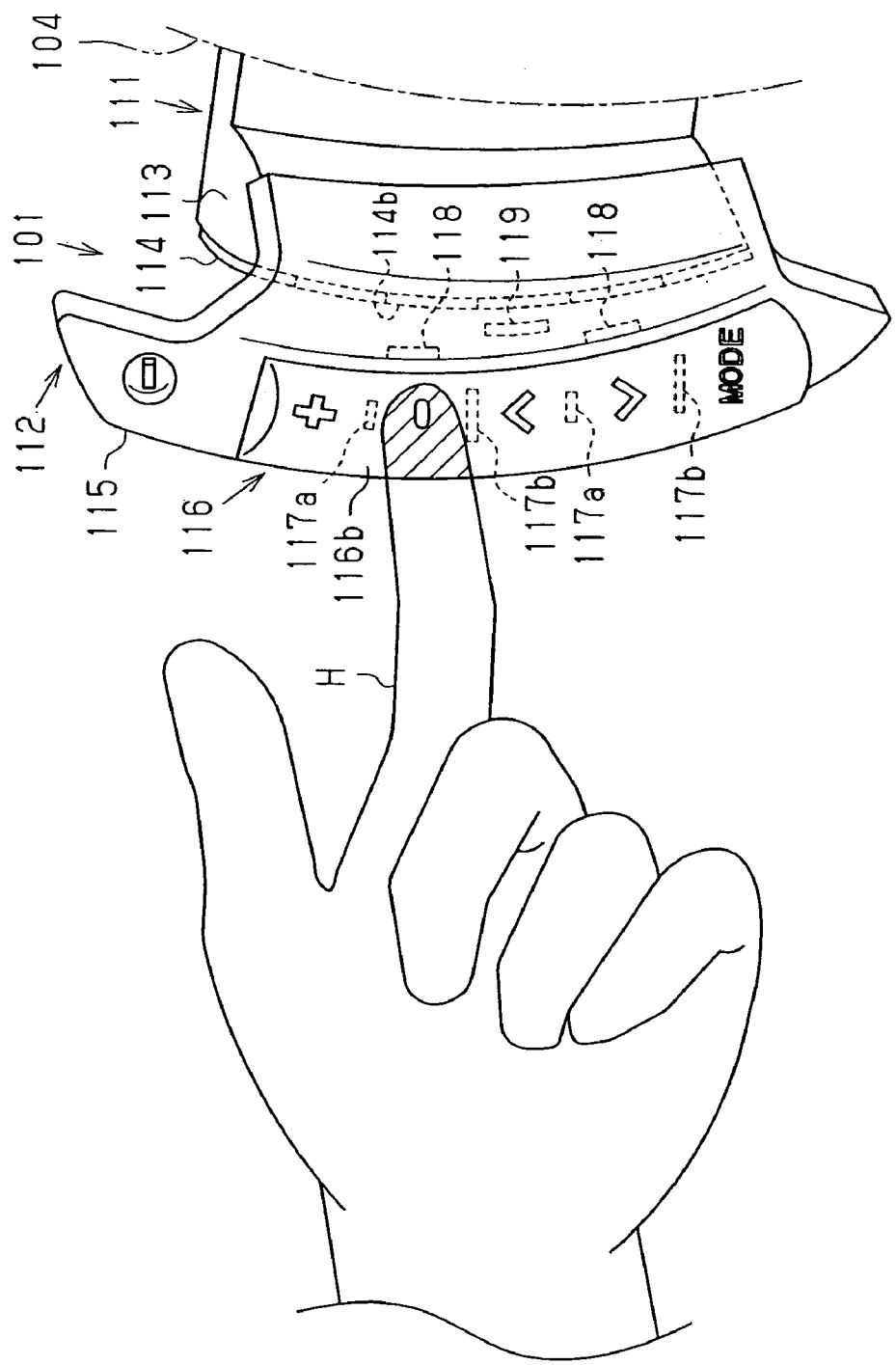
FIG. 5 is an enlarged perspective view of the vehicle switch apparatus shown in FIG. 1 illustrating the operation of the vehicle switch apparatus.

As described above, the two short partitions 117a or 127a and the two long partitions 117b or 127b are alternately arranged on the rear side of the window 116 or 126. This enables the driver to select one of the first to fifth window sections 116a to 116e or 126a to 126e by touching the short partitions 117a or 127a and the long partitions 117b or 127b without viewing the window 116 or 126. The driver pushes the operation portion 114 or 124 located at the inner side of the selected one of the window sections 116a to 116e or 126a to 126e. This enables the driver to push the first to fifth operation portions 114a to 114e or 124a to 124e respectively corresponding to the first to fifth window sections 116a to 116e or 126a to 126e. When, for example, the driver intends to operate the second operation portion 114b in the switch apparatus 101, the driver extends his or her finger between the upper short partition 117a and the upper long partition 117b on the rear side of the window 116 as shown in FIG. 5. This enables the driver to select the second window section 116b without directly viewing the window 116.

When the driver extends his or her finger to the operation portion 114 or 124 of the push switch 111 or 121 to operate the operation portion 114 or 124, the sensor 118 or 128 detects the approaching of the driver's finger and starts to provide the controller 130 with an ON signal (detection signal) (refer to FIG. 4). The controller 130 executes control based on the ON signal to light the light source 119 or 129. The window 116 or 126 is illuminated by the light source 119 or 129 from the rear side. The windows 116 and 126 are translucent and have a light transmission property. Thus, a shadow appears only on a selected part of the window 116 or 126, that is, only on part of the window 116 or 126 where the driver's finger is located, so that the symbol or characters on the selected part of the window 116 or 126 becomes visually distinctive. For example, when the second window section 116b in the switch apparatus 101 is selected as shown in FIG. 5, the symbol "−" becomes visually distinctive. This enables the driver to recognize which window section is selected by his or her finger H, that is, recognize which operation portion his or her finger is located near, by just glancing at the window 116 or 126. As a result, when the driver is selecting the wrong window section, this is quickly recognized by the driver. This structure prevents the push switches 111 and 121 from being erroneously operated.

When ending operation of the push switch 111 or 121, the driver moves his or her finger H away from the operation portion 114 or 124. Then, the sensor 118 or 128 stops providing the controller 130 with an ON signal. The controller 130 then terminates control of the light source 119 or 129. This turns off the light source 119 or 129.

[Advantages of the First Embodiment]

The switch apparatuses 101 and 102 of the first embodiment have the advantages described below.

(1) The operation portions 114 and 124 of the push switches 111 and 121 are arranged on the rear sides of the paddles 115 and 125. The paddles 115 and 125 include the windows 116 and 125 having a light transmission property. Thus, when operating the operation portions 114 and 124, the driver is able to visually check operation of the operation portions 114 and 124 of the push switches 111 and 121 through the windows 116 and 126. This structure improves the operation reliability of the push switches 111 and 121 compared with when the driver can only feel for the push switches 111 and 121.

(2) The windows 116 and 126 of the paddles 115 and 125 are located at positions corresponding to where the driver's fingers H would be extended across when operating the operation portions 114 and 124. This enables the driver to view the finger H operating the operation portions 114 and 124 through the windows 116 and 126.

(3) The switch apparatuses 101 and 102 include the light sources 119 and 129, which illuminate the translucent windows 116 and 126 from the rear side. When the windows 116 and 126 are illuminated from the rear side by the light sources 119 and 129, that is, when the push switches 111 and 121 are operated, the driver is able to visually check the operation of the push switches 111 and 121 through the windows 116 and 126.

(4) The push switches 111 and 121 are arranged on the sides of the paddles 115 and 125 opposite to the driver. In other words, dead space near the driver's seat is effectively used. This increases space for other switches.

[Second Embodiment]

Vehicle switch apparatuses 105 and 106 according to a second embodiment of the present invention will now be described with reference to FIGS. 6 and 7.

Figure 6:
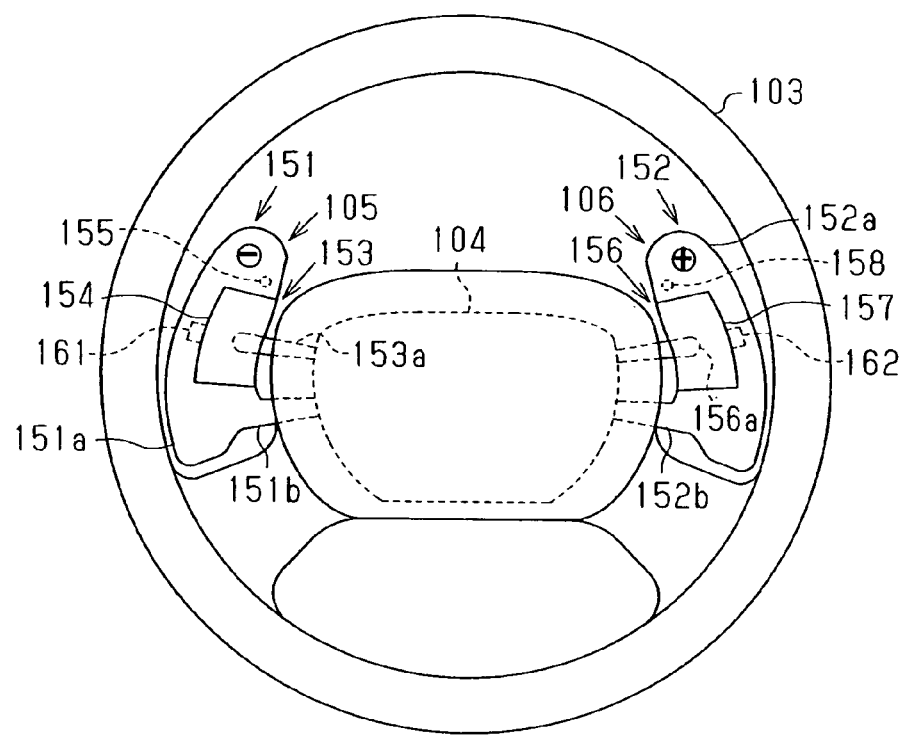
FIG. 6 is a front view showing vehicle switch apparatuses according to a second embodiment of the present invention.

As shown in FIG. 6, the vehicle switch apparatus 105 is arranged on the left side of a column 104 of a steering wheel 103, and the vehicle switch apparatus 106 is arranged on the right side of the column 104. The vehicle switch apparatuses 105 and 106 are hereafter simply referred to as the switch apparatuses 105 and 106. The switch apparatus 105 includes a gearshift down switch 151 and a lever switch 153. The lever switch 153 includes a lever 153a. The switch apparatus 106 includes a gearshift up switch 152 and a lever switch 156. The lever switch 156 includes a lever 156a.

Figure 7A:
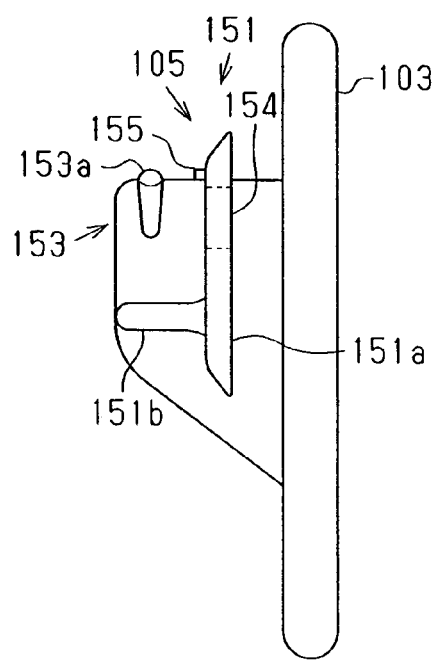
FIG. 7A is a side view of the vehicle switch apparatus shown in the left portion of FIG. 6.

As shown in FIG. 6, the gearshift down switch 151 includes a paddle 151a and a support 151b. The symbol "−" is marked on the top portion of the paddle 151a. The support 151b is formed integrally with the paddle 151a. The support 151b is supported on the base of the column 104 so that it can be tilted toward the front and rear. The driver pushes the rear side of the paddle 151a of the gearshift down switch 151 toward himself or herself while gripping the steering wheel 103 to lower the gear of the transmission, or perform a gearshift down operation. A window 154 (viewer) is arranged on the paddle 151a at a position facing the lever 153a. The window 154 is made of translucent synthetic resin or glass and has a light transmission property. The surface of the lever 153a is formed from a material that reflects light, such as metal. A sensor 161 is arranged outward from the window 154 at the rear side of the paddle 151a. The sensor 161 outputs an ON signal when a finger approaches the sensor 161 to operate the lever switch 153. As shown in FIG. 7A, a light source 155 for illuminating the lever 153a of the lever switch 153 is arranged on the rear side of the paddle 151a. The surface of the lever 153a reflects light when illuminated by the light source 155.

Figure 7B:
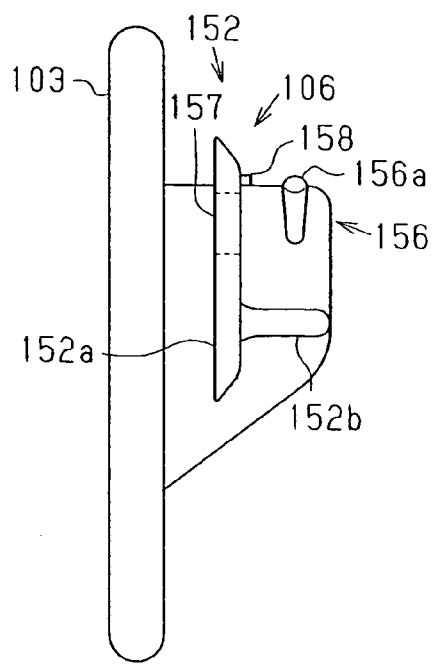
FIG. 7B is a side view of the vehicle switch apparatus shown in the right portion of FIG. 6.

As shown in FIG. 6, the gearshift up switch 152 includes a paddle 152a and a support 152b. The symbol "+" is marked on the top portion of the paddle 152a. The support 152b is formed integrally with the paddle 152a. The support 152b is supported on the base of the column 104 so that it can be tilted toward the front and rear. The driver pushes the rear side of the paddle 152a of the gearshift up switch 152 toward himself or herself while gripping the steering wheel 103 to raise the gear of the transmission, or perform a gearshift up operation. A window 157 (viewer) is arranged on the paddle 152a at a position facing the lever 156a. The window 157 is made of translucent synthetic resin or glass and has a light transmission property. The surface of the lever 156a is formed from a material that reflects light, such as metal. A sensor 162 is arranged outside the window 157 on the rear side of the paddle 152a. The sensor 162 outputs an ON signal when a finger approaches the sensor 162 to operate the lever switch 156. As shown in FIG. 7B, a light source 158 for illuminating the lever 156a of the lever switch 156 is arranged on the rear side of the paddle 152a. The surface of the lever 156a reflects light when illuminated by the light source 158.

[Operation of the Second Embodiment]

The following describes the operation of the switch apparatuses 105 and 106.

The driver pushes rear side of the paddle 151a of the gearshift down switch 151 or the paddle 152a of the gearshift up switch 152 toward himself or herself while gripping the steering wheel 103 to raise or lower the gear of the transmission, that is, to execute the gearshift up operation or the gearshift down operation.

To operate the lever 153a or 156a of the lever switch 153 or 156 of the switch apparatus 105 or 106, the driver extends his or her finger to the lever 153a or 156a. Then, the sensor 161 or 162 detects the approach of the driver's finger and starts generating an ON signal. In response to the ON signal provided from the sensor 161 or 162, the light source 155 or 158 is lit up to illuminate the surface of the lever 153a or 156a. Then, the surface of the lever 153a or 156a reflects light. The lever 153a or 156a becomes visually distinctive to the driver through the translucent window 154 or 157. This structure enables the driver to easily recognize his or her operation of the lever 153a or 156a just by glancing at the window 154 or 157. The driver ends his or her operation of the lever switch 153 or 156 and moves his or her finger away from the lever 153a or 156a. Then, the sensor 161 or 162 stops generating the ON signal, and the light source 155 (158) is turned off.

[Advantages of the Second Embodiment]

The vehicle switch apparatuses 105 and 106 of the second embodiment have the advantages described below.

(1) The windows 154 and 157 face the levers 153a and 156a of the lever switches 153 and 156, respectively. This structure enables the driver to visually check the levers 153a and 156a through the windows 154 and 157.

(2) The windows 154 and 157 are translucent. The light sources 155 and 158 illuminate the levers 153a and 156a of the lever switches 153 and 156. Thus, when the light sources 155 and 158 are lit up, that is, when the lever switches 153 and 156 are operated, the driver is able to visually check operation of the levers 153a and 156a through the windows 154 and 157.

[Third Embodiment]

A door switch 107 according to a third embodiment of the present invention will now be described with reference to FIGS. 8A to 8C.

Figure 8A:
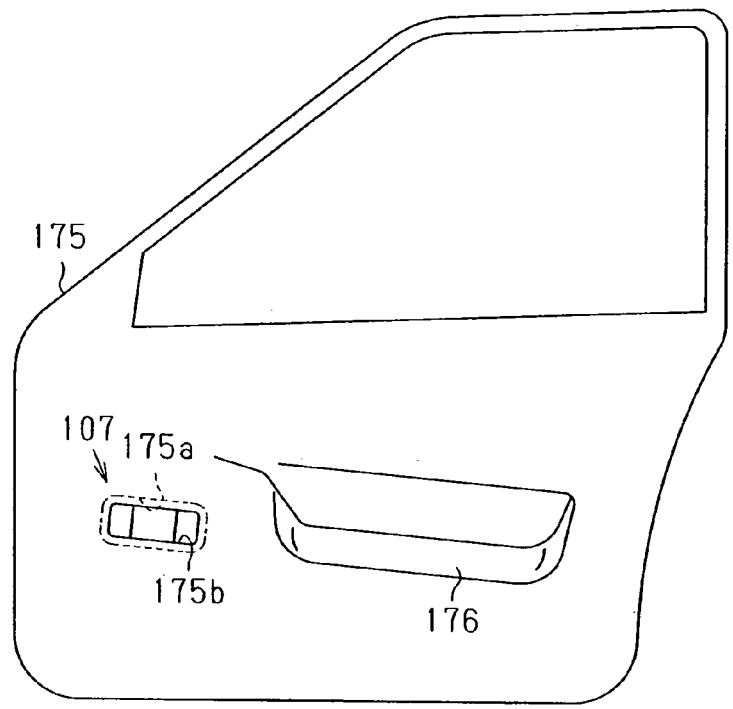
FIG. 8A is a front view showing a door switch according to a third embodiment of the present invention.

As shown in FIG. 8A, the door switch 107 is arranged at a position lower than an armrest 176 of a vehicle door 175 beside the driver's seat. In detail, the door switch 107 is arranged in an opening 175b of a recess 175a, which is formed in the vehicle door 175. The driver (operator) is able to open the vehicle door 175 by operating the door switch 107 from inside the vehicle.

Figure 8B:
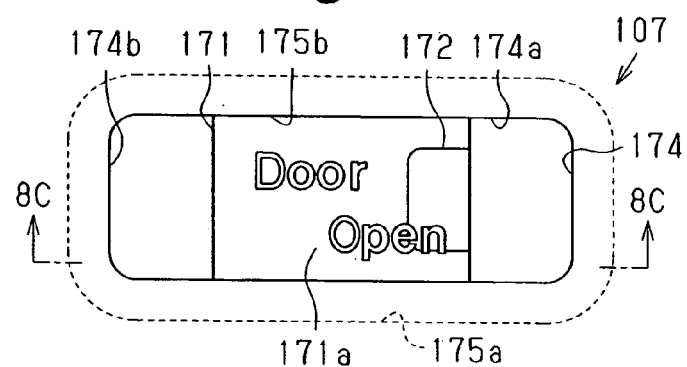
FIG. 8B is an enlarged view of the door switch of FIG. 8A.

As shown in FIG. 8B, the door switch 107 includes a cover 171 and a push switch 172. The cover 171 functions as a viewer. The push switch 172 is arranged at the rear side of the cover 171. The push switch 172 has an operation portion 172a, which projects toward the exterior of the vehicle.

The cover 171 is a transparent plate. In the middle portion of the opening 175b, an upper end portion and a lower end portion of the cover 171 are respectively fixed to upper and lower edges of the opening 175b. Gaps 174a and 174b are formed between the cover 171 and the side walls of the opening 175b. Each of the gaps 174a and 174b is sized to allow the insertion of a finger. The characters 171a "Door Open" are marked on a front surface of the cover 171 (surface facing the driver). Further, in the passenger compartment, the surface of the cover 171 is flush with the surface of the vehicle door 175 as shown in FIG. 8C.

Figure 8C:
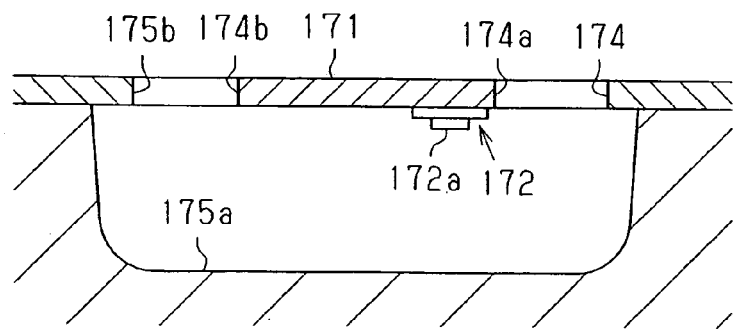
FIG. 8C is a cross-sectional view of the door switch taken along line 8C—8C of FIG. 8B.

As shown in FIG. 8C, the push switch 172 is arranged in the vicinity of the gap 174a, which is closer to the driver when the driver is seated in the vehicle. The push switch 172 opens the vehicle door 175 when the driver pushes the operation portion 172a toward himself or herself (in the upward direction as viewed in FIG. 8C).

The operation of the door switch 107 will now be described.

The driver, when seated in the driver's seat, opens the vehicle door 175 by inserting his or her finger in the gap 174a or the gap 174b of the door switch 107 and pushing the operation portion 172a of the push switch 172 toward himself or herself. The cover 171 is transparent. This enables the driver to visually check his or her finger when operating the push switch 172.

[Advantages of the Third Embodiment]

The door switch 107 of the third embodiment has the advantages described below.

(1) The cover 171 is transparent. Thus, the driver is able to visually check his or her finger when operating the push switch 172. This improves the operation reliability of the push switch 172.

(2) The operation portion 172a of the push switch 172 is arranged on the rear surface of the cover 171. In the vehicle compartment, the surface of the vehicle door 175 is flush with the surface of the cover 171 (door switch 107). Thus, the door switch 107 is indistinctive on the vehicle door 175.

(3) The push switch 172 is arranged on the rear surface of the cover 171. In other words, dead space in the vehicle is effectively used. This increases space for other switches.

[Fourth Embodiment]

Vehicle switch apparatuses 201 and 202 according to a fourth embodiment of the present invention will now be described with reference to FIGS. 9 to 12. The fourth embodiment is similar to the first embodiment but mainly differs from the first embodiment in that a touch switch is used instead of a push switch.

Figure 9:
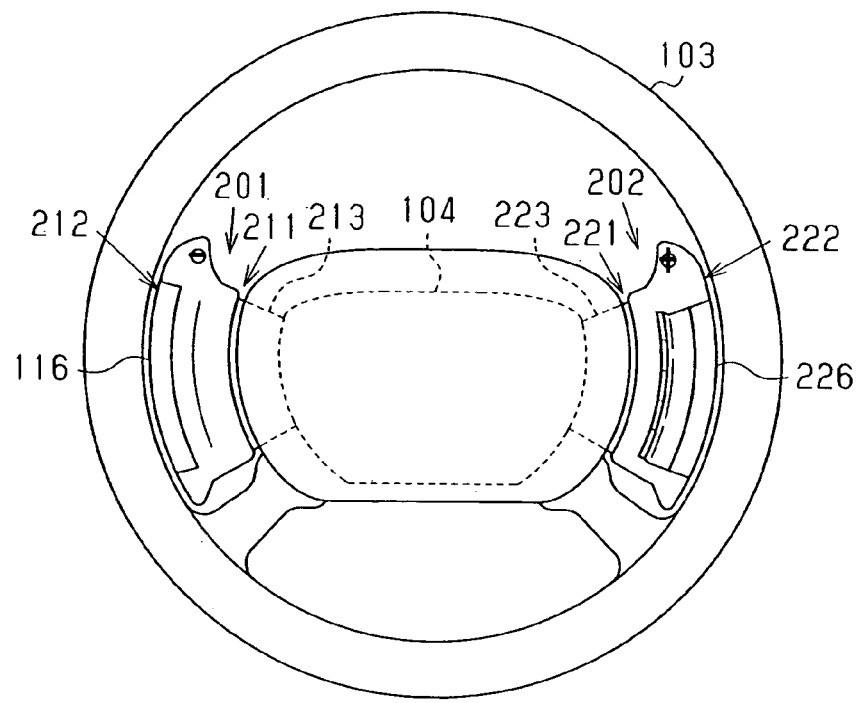
FIG. 9 is a front view showing vehicle switch apparatuses according to a fourth embodiment of the present invention.

As shown in FIG. 9, the vehicle switch apparatus 201 is arranged on the left side of a column 104 of a steering wheel 103, and the vehicle switch apparatus 202 is arranged on the right side of the column 104. The vehicle switch apparatuses 201 and 202 are hereafter simply referred to as the switch apparatuses 201 and 202. Control levers for a turn signal switch, a front light switch, a wiper switch, etc. (combination switches) are arranged on the left side and the right side of the column 104 but are not shown in the drawing.

[Switch Apparatus 201]

As shown in FIG. 9, the switch apparatus 201 includes a gearshift down switch 212 and a switch mechanism 211. The gearshift down switch 212 has a window 116.

Figure 10A:
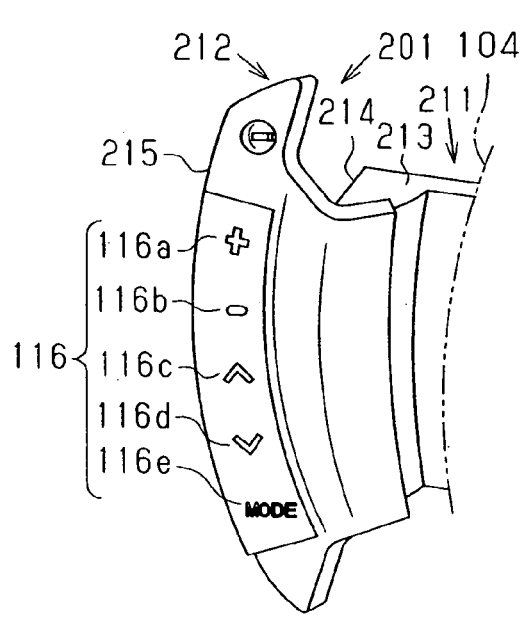
FIG. 10A is an enlarged perspective view of the vehicle switch apparatus shown in a left portion of FIG. 9.

As shown in FIG. 10A, the gearshift down switch 212 includes a main body 213, which is supported on the base of the column 104. The gearshift down switch 212 includes a paddle 215 (cover), which is fixed to the main body 213. The symbol "−" is marked on the top portion of the paddle 215. The window 116 is arranged on the paddle 215. The main body 213 is tiltable toward the front and the rear together with the paddle 215. The driver (operator) pushes the rear side of the paddle 215 toward himself or herself while gripping the steering wheel 103 to lower the gear of the transmission, or perform a gearshift down operation.

As shown in FIGS. 10A and 11A, the main body 213 of the switch mechanism 211 includes a touch switch 214, which is arranged so that its surface is flush with the surface of the main body 213. The touch switch 214 is arranged on the rear side of the paddle 215, that is, the side of the paddle 215 opposite to the driver. The touch switch 214 is an electrostatic capacity type touch panel switch, which outputs an ON signal or an OFF signal when touched by a hand. The touch switch 214 is transparent or translucent.

As shown in FIG. 11A, the touch switch 214 includes a first touch switch 214a, a second touch switch 214b, a third touch switch 214c, a fourth touch switch 214d, and a fifth touch switch 214e. The first to fifth touch switches 214a to 214e are arranged in parallel with one another in the stated order from the upper side of the touch switch 214.

The window 116 of the paddle 215 is located at the outer side of the touch switch 214 of the switch mechanism 211 in correspondence with where fingers would be extended across to operate the touch switch 214. As shown in FIGS. 10A and 11A, the window 116 in the fourth embodiment has the same structure as the window 116 in the first embodiment.

Referring to FIG. 11A, the first touch switch 214a is for increasing the volume of the car stereo. The second touch switch 214b is for decreasing the volume of the car stereo. The third touch switch 214c is for selecting a song on a music CD or a radio channel in one direction. The fourth touch switch 214d is for selecting a song on a music CD or a radio channel in a direction opposite to the selection direction of the third touch switch 214c. The fifth touch switch 214e is for selecting a mode, such as radio or music CD.

A sensor 118 is arranged between the second touch switch 214b and the second window section 116b, and between the fourth touch switch 214d and the fourth window section 116d. A light source 119 is arranged between the third touch switch 214c and the third window section 116c to illuminate the window 116 from the rear side.

[Switch Apparatus 202]

As shown in FIG. 9, the switch apparatus 202 includes a switch mechanism 221 and a gearshift up switch 222. The gearshift up switch 222 has a window 226.

Figure 10B:
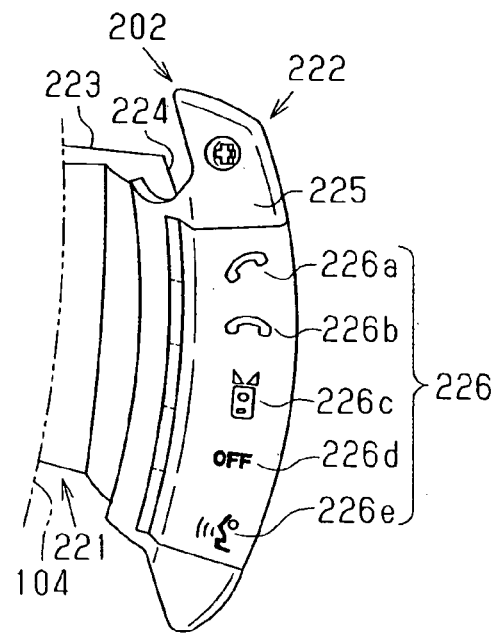
FIG. 10B is an enlarged perspective view of the vehicle switch apparatus shown in the right portion of FIG. 9.

As shown in FIG. 10B, the gearshift up switch 222 includes a main body 223 (support), which is supported on the base of the column 104. The gearshift up switch 222 includes a paddle 225 (cover), which is fixed to the main body 223. The symbol "+" is marked on the top portion of the paddle 225. The window 226 is arranged on the paddle 225 and extends to the vicinity of the base of the paddle 225. The window 226 is larger than the window 116. The main body 223 is tiltable toward the front and the rear together with the paddle 225. The driver (operator) pushes the rear side of the paddle 225 toward himself or herself while gripping the steering wheel 103 to raise the gear of the transmission, or perform a gearshift up operation.

As shown in FIGS. 10B and 11B, the main body 223 of the switch mechanism 221 includes a touch switch 224, which is arranged so that its surface is flush with the surface of the main body 223. The touch switch 224 is arranged on the rear side of the paddle 225, that is, at the side of the paddle 225 opposite to the driver. The driver can visually check the touch switch 224 through the window 226. Like the touch switch 214, the touch switch 224 is an electrostatic capacity type touch panel switch, which outputs an ON signal or an OFF signal when touched by a hand.

As shown in FIG. 11B, the touch switch 224 includes a first touch switch 224a, a second touch switch 224b, a third touch switch 224c, a fourth touch switch 224d, and a fifth touch switch 224e. The first to fifth touch switches 224a to 224e are arranged in parallel with one another in the stated order from the upper side of the touch switch 224.

The window 226 of the paddle 225 is located at the outer side of the touch switch 224 of the switch mechanism 221 in correspondence with where the fingers would be extended across to operate the touch switch 224. As shown in FIGS. 10B and 11B, the window 226 in the fourth embodiment has the same structure as the window 126 in the first embodiment except in that the window 226 extends to the vicinity of the base of the paddle 225.

The first touch switch 224a is for initiating a call with a telephone installed in the vehicle. The second touch switch 224b is for terminating a telephone call. The third touch switch 224c is for activating a vehicle crash monitoring system for vehicles. The fourth touch switch 224d is for deactivating the vehicle crash monitoring system. The fifth touch switch 224e is for activating a vehicle voice recognition apparatus.

A sensor 128 is arranged between the second touch switch 224b and the second window section 226b, and between the fourth touch switch 224d and the fourth window section 226d. A light source 129 is arranged between the third touch switch 224c and the third window section 226c to illuminate the window 226 from the rear side.

[Controller 130]

As shown in FIG. 12, a controller 130 is electrically connected to the gearshift down switch 212 and the gearshift up switch 222 and to the touch switches 214 and 224. The switches 212, 214, 222, and 224 provide the controller 130 with an operation signal. In the same manner as in the first embodiment, the sensors 118 and 128 are connected to the controller 130 and provide the controller 130 with an ON signal (detection signal). The controller 130 is electrically connected to an automatic transmission (A/T) 131, a car stereo 132, and a telephone 133, which are installed in the vehicle, and to the light sources 119 and 129, which are included in the switch apparatuses 201 and 202.

The controller 130 includes a plurality of driving circuits (not shown) for driving the A/T 131, the car stereo 132, the telephone 133, and the light sources 119 and 129. The controller 130 provides each driving circuit with a control signal according to an operation signal and an ON signal provided from the gearshift down switch 212, the gearshift up switch 222, the touch switches 214 and 224, and the sensors 118 and 128. Each driving circuit drives the A/T 131, the car stereo 132, the telephone 133, or the light sources 119 and 129 according to a control signal.

[Operation of the Fourth Embodiment]

The operation of the switch apparatuses 201 and 202 will now be described.

In the same manner as in the first embodiment, the driver pushes the paddle 215 toward himself or herself to lower the gear of the transmission and pushes the paddle 225 toward himself or herself to raise the gear.

To operate the first to fifth touch switches 214a to 214e or 224a to 224e of the switch mechanism 211 or 221 (refer to FIGS. 11A and 11B), the driver extends his or her finger to the rear side of the window 116 or 226 of the paddle 215 or 225 while gripping the steering wheel 103.

The driver selects one of the first to fifth window sections 116a to 116e or 226a to 226e by touching the short partitions 117a or 127a and the long partitions 117b or 127b without viewing the window 116 or 226. The driver then touches the touch switch 214 or 224 located at the inner side of the selected one of the window sections 116a to 116e or 226a to 226e. In this way, the driver touches the first to fifth touch switches 214a to 214e or 224a to 224e respectively corresponding to the first to fifth window sections 116a to 116e or 226a to 226e (for example, the second window section 116b is selected in the same manner as shown in FIG. 5).

When the driver extends his or her finger H to the touch switch 214 or 224 of the switch mechanism 211 or 221 to operate the touch switch 214 or 224, the sensor 118 or 128 detects the approach of the driver's finger H and starts providing the controller 130 (refer to FIG. 12) with an ON signal (detection signal) in the same manner as in the first embodiment. The controller 130 executes control based on the ON signal so that the light source 119 or 129 is lit up. The window 116 or 226 is illuminated by the light source 119 or 129 from the rear side. In the same manner as in the first embodiment, a shadow appears only on a selected part of the window 116 or 226, that is, only on part of the window 116 or 226 where the driver's finger is located, so that the symbol or characters on the selected part of the window 116 or 226 becomes visually distinctive. This enables the driver to recognize which window section is selected by the finger H, that is, recognize which touch switch the finger is approaching, just by glancing at the window 116 or 226. As a result, when the driver is selecting the wrong touch switch, this is quickly recognized by the driver. This structure prevents the touch switches 214 and 224 from being erroneously operated.

Afterward, the driver moves the finger H away from the touch switch 214 or 224. Then, the light source 119 or 129 is turned off in the same manner as in the first embodiment.

[Advantages of the Fourth Embodiment]

The switch apparatuses 201 and 202 of the fourth embodiment have the advantages described below.

(1) The touch switches 214 and 224 are arranged on the rear side of the paddles 215 and 225. The windows 116 and 226 are located at the outer side of the touch switches 214 and 224 in correspondence with where the fingers would be extended across to operate the touch switches 214 and 224. Thus, when operating the touch switches 214 and 224, the driver is able to visually check operation of the touch switches 214 and 224 through the windows 116 and 226. This structure improves operation reliability of the touch switches 214 and 224 compared with when the driver has to feel for the touch switches 214 and 224.

(2) The window 226 is larger than the window 116. Thus, when operating the touch switch 224, the driver is able to easily recognize the distance from the finger H to the touch switch 224. Further, the driver is able to visually check the finger H until the moment the finger H touches the touch switch 224. This further improves operation reliability of the touch switch 224.

(3) The touch switches 214 and 224 are arranged so that their surfaces are respectively flush to the surfaces of the main bodies 213 and 223. This structure provides a smooth touch surface. Unlike push switches, the touch switches 214 and 224 do not have protrusions. This prevents an increase in the size of the switch apparatuses and also provides a satisfactory tactile feedback.

(4) The touch switches 214 and 224 are arranged at the sides of the paddles 215 and 225 opposite to the driver (the rear side of the paddles 215 and 225). In other words, dead space near the driver's seat is effectively used. This increases space for arranging other switches.

(5) In the main bodies 213 and 223, the touch switches 214 and 224 are arranged on the rear side of the paddles 215 and 225. Thus, the touch switches 214 and 224 are not easily noticed from the front of the steering wheel 103. This prevents children from playing with the touch switches 214 and 224.

(6) The number of switches arranged on the surface of the installment panel in front of the driver's seat is reduced. This improves the aesthetic appeal around the driver's seat.

[Fifth Embodiment]

A vehicle switch apparatus 205 according to a fifth embodiment of the present invention will now be described with reference to FIGS. 13, 14A, and 14B.

Figure 13:
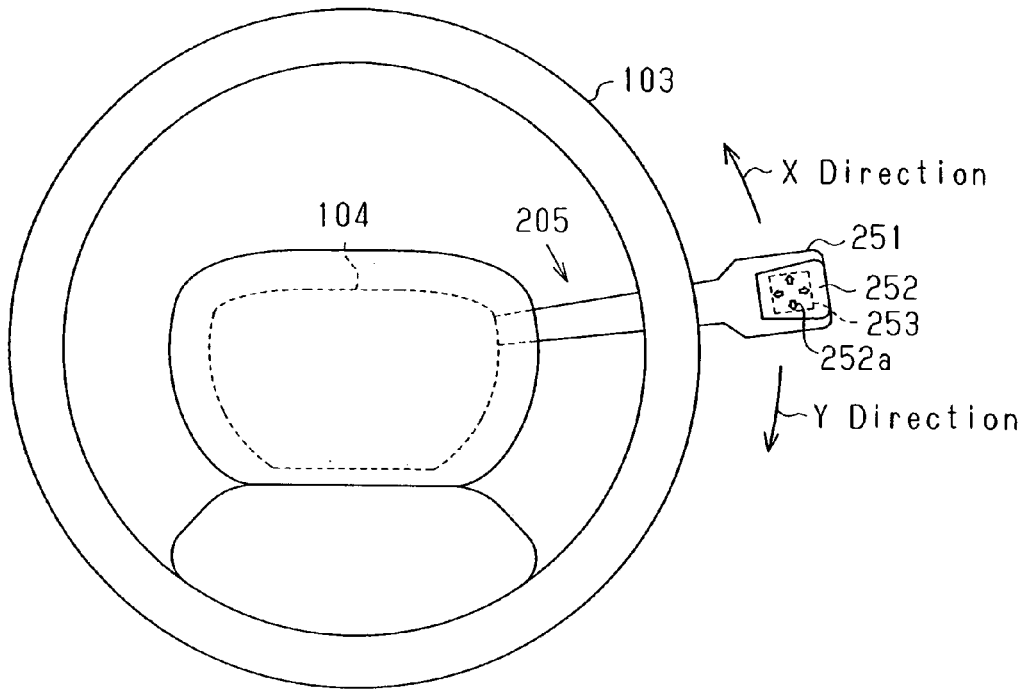
FIG. 13 is a front view showing a vehicle switch apparatus according to a fifth embodiment of the present invention.

As shown in FIG. 13, the vehicle switch apparatus 205 is arranged on the right side of a column 104 of a steering wheel 103. The vehicle switch apparatus 205 is hereafter simply referred to as the switch apparatus 205. The switch apparatus 205 is a combination switch including a turn signal switch etc., of the vehicle.

The switch apparatus 205 includes a lever switch 251 (cover), a window 252, and a touch switch 253. The window 252 functions as a viewer. The lever switch 251 and the touch switch 253 are electrically connected to a controller (not shown). The lever switch 251 is supported on the column 104 to be pivotal in an X direction (upward direction) and a Y direction (downward direction) about the column 104. When pivoted in the X direction, the lever switch 251 provides the controller with a signal indicating that the lever switch 251 has been pivoted in the X direction. The controller then outputs a signal instructing flashing of a left signal light (not shown) arranged on the exterior of the vehicle. When pivoted in the Y direction, the lever switch 251 provides the controller with a signal indicating that the lever switch 251 has been pivoted in the Y direction. The controller then outputs a signal instructing flashing of a right signal light arranged on the exterior of the vehicle.

The surface of the lever switch 251 is formed from a material that reflects light, such as metal. As shown in FIGS. 14A and 14B, the window 252 is arranged on the distal portion of the lever switch 251. The window 252 is made of translucent synthetic resin or glass and has a light transmission property. Printed or painted symbols of four arrows 252a pointing upward, downward, rightward, and leftward directions are marked on the surface of the window 252 facing the rear side of the vehicle (the surface facing the driver). The four arrows 252a are used by the driver to operate a car navigation system. The touch switch 253 is arranged on rearward of the window 252. The arrows 252a are arranged facing the touch switch 253 through the window 252. The touch switch 253 is transparent or translucent. For example, the touch switch 253 is an electrostatic capacity type touch panel switch, which outputs an ON signal or an OFF signal when touched by a hand. The touch switch 253 detects coordinates of a point on the touch switch 253 touched by a finger. Based on the coordinates of the point touched by a finger, the touch switch 253 specifies which one of the four arrows 252a is operated.

The touch switch 253 includes an exposed portion 253a, which is exposed from the window 252. The driver moves a cursor on the screen of the car navigation system by touching the exposed portion 253a. For example, the driver touches a point on the exposed portion 253a that corresponds to the right arrow 252a as shown in FIG. 14A. Then, the touch switch 253 provides the controller with a signal indicating that the driver has touched the point of the exposed portion 253a that corresponds to the right arrow 252a. This moves the cursor on the screen of the car navigation system to the right. Further, the exposed portion 253a is arranged so that it is flush to the rear surface of the window 252. The dimension of the window 252 in the longitudinal direction of the lever switch 251 is set so that the driver can visually check the touch switch 253.

[Operation of the Fifth Embodiment]

The operation of the switch apparatus 205 will now be described.

Referring to FIG. 13, for example, the driver pivots the lever switch 251 in the X direction. The switch apparatus 205 provides the controller (not shown) with a signal indicating that the driver has pivoted the lever switch 251 in the X direction. As a result, the controller outputs a signal instructing the left signal light (not shown) of the vehicle to flash. The left signal light stops flashing when the driver pivots the lever switch 251 back to the original position. The driver pivots the lever switch 251 in the Y direction. As a result, the switch apparatus 205 provides the controller with a signal indicating that the driver has pivoted the lever switch 251 in the Y direction. Then, the controller outputs a signal instructing the right signal light (not shown) of the vehicle to flash. The right signal light stops blinking when the driver moves the lever switch 251 back to the original position.

Figure 14A:
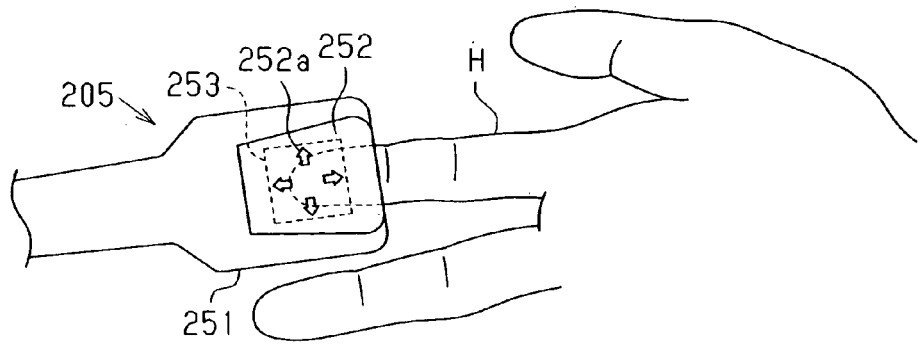
FIG. 14A is a partially enlarged view of the vehicle switch apparatus shown in FIG. 13.
Figure 14B:
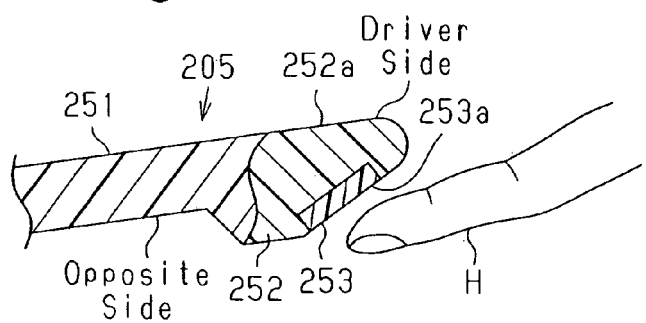
FIG. 14B is a side cross-sectional view of the vehicle switch apparatus of FIG. 14A.

As shown in FIGS. 14A and 14B, the driver is able to view the finger H through the window 252 when operating the touch switch 253. When the finger H reaches the rear side of one of the arrows 252a (e.g., the right arrow) on the window 252, the driver moves the finger H toward himself or herself. Since the touch switch 253 is arranged just behind the rear side of the arrows 252a, the finger H touches the touch switch 253 (i.e., the exposed portion 253a of the touch switch 253). The touch switch 253 provides the controller with an ON signal. The controller outputs a signal for moving the cursor toward the right on the screen of the car navigation system. Thus, the cursor moves toward the right on the screen.

[Advantages of the Fifth Embodiment]

(1) The lever switch 251 includes the window 252. The touch switch 253 is arranged on the rear side of the window 252. The driver may view his or her finger H through the window 252 when operating the touch switch 253. As a result, when the driver makes the wrong selection, the driver is able to recognize the wrong selection just by glancing at the window 252. This prevents the touch switch 253 from being erroneously operated and improves operation reliability of the touch switch 253 compared to when feeling for the touch switch 253 to operate it.

(2) The touch switch 253 is arranged at the side of the window 252 opposite to the driver. In other words, dead space in the vehicle is effectively used. This increases space for arranging other switches.

(3) The exposed portion 253a of the touch switch 253 is flush with the rear surface of the window 252. Thus, the driver is given a good tactile feedback when operating the touch switch 253. Further, the driver may easily operate the touch switch 253 by sliding his or her finger H on the touch switch 253. Accordingly, the driver may operate the touch switch 253 without visually checking the window 252. This improves convenience.

[Sixth Embodiment]

A door switch 207 according to a sixth embodiment of the present invention will now be described with reference to FIGS. 15A to 15C. The sixth embodiment is similar to the third embodiment except in that a touch switch is used instead of a push switch.

Figure 15A:
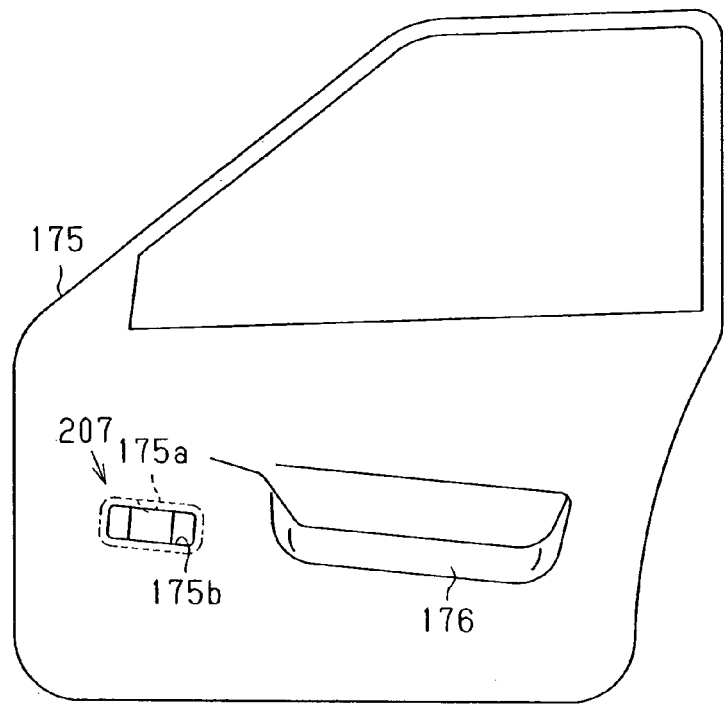
FIG. 15A is a front view showing a door switch according to a sixth embodiment of the present invention.

As shown in FIG. 15A, the door switch 207 for opening a vehicle door 175 is arranged on the vehicle door 175 near the driver's seat.

Figure 15B:
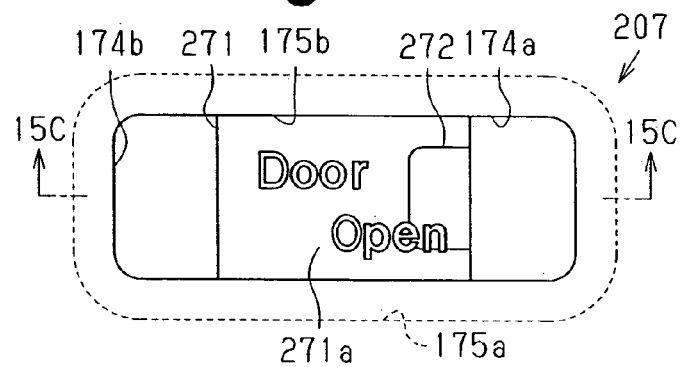
FIG. 15B is an enlarged view of the door switch of FIG. 15A.
Figure 15C:
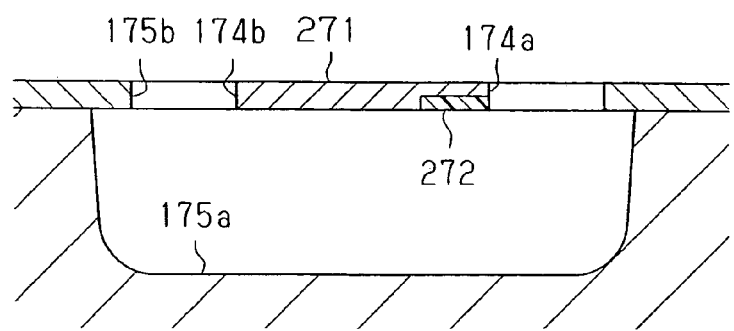
FIG. 15C is a cross-sectional view of the door switch taken along line 15C—15C of FIG. 15B.

As shown in FIGS. 15B and 15C, the door switch 207 includes a cover 271 and a touch switch 272. The cover 271 is transparent. The touch switch 272 is arranged on the rear surface of the cover 271. The touch switch 272 is, for example, an electrostatic capacity type touch panel switch, which outputs an ON signal or an OFF signal when touched by a hand. The touch switch 272 is transparent or translucent. The rear surface of the cover 271 is flush with the touch switch 272.

The cover 271 has the same structure as the cover 171 in the third embodiment. In the same manner as in the third embodiment, the cover 271 is arranged in an opening 175b.

As shown in FIG. 15C, the touch switch 272 is arranged near a gap 174a, which is located near the driver when the driver is seated in the driver's seat. The touch switch 272 opens the vehicle door 175 when the touch switch 272 (specifically the lower surface of the touch switch 272 in FIG. 15C) is touched.

[Operation of the Sixth Embodiment]

The operation of the door switch 207 will now be described.

The driver seated in the driver's seat opens the vehicle door 175 by inserting his or her finger in the gap 174a or the gap 174b of the door switch 207 and touching the touch switch 272. The cover 271 is transparent. This enables the driver to visually check his or her finger when operating the touch switch 272.

[Advantages of the Sixth Embodiment]

The door switch 207 of the sixth embodiment has the advantages described below.

(1) The cover 271 is transparent. Thus, the driver may visually check his or her finger when operating the touch switch 272. This improves the operation reliability of the touch switch 272.

(2) The touch switch 272 is arranged on the rear surface of the cover 271 (the surface opposite to the driver's). In other words, dead space in the vehicle is effectively used. This increases space for arranging other switches.

(3) The touch surface of the touch switch 272 is flush with the rear surface of the cover 271. The driver is given good tactile feedback when operating the touch switch 272. Further, the driver may easily touch the touch switch 272 just by sliding his or her finger on the touch switch 272. Accordingly, the driver may touch the touch switch 272 without visually checking the cover 271. This improves convenience.

(4) The touch switch 272 is not easily noticed from the front of the cover 271. This prevents children from playing with the touch switch 272.

It should be apparent to those skilled in the art that the present invention may be embodied in many other specific forms without departing from the spirit or scope of the invention. Particularly, it should be understood that the present invention may be embodied in the following forms.

In the first, second, fourth, and fifth embodiments, the windows 116, 126, 154, 157, 226, and 252 are translucent. Alternatively, transparent windows may be used.

In the first, second, and fourth embodiments, the sensors 118, 128, 161, and 162 detect approach of the driver's finger to light the light sources 119, 129, 155, and 158. Alternatively, the light sources 119, 129, 155, and 158 may be lit up when the instrument panel of the automobile is lit up.

In the first and fourth embodiments, the windows 116, 126, and 226 are positioned at the outer side of the operation portions 114 and 124 or the touch switches 214 and 224. However, the windows 116, 126, and 226 may be at arranged at any positions that enable the driver to visually check his or her finger when operating the operation portions 114 and 124 or the touch switches 214 and 224. For example, the paddles 115, 125, 215, and 225 may have rectangular windows located adjacent to the operation portions 114 and 124 or the touch switches 214 and 224.

In the second embodiment, the windows 154 and 157 are positioned to face the levers 153a and 156a. However, the windows 154 and 157 may be located at any position that enables the driver to visually check the operation of the lever switches 153 and 156. For example, the paddles 151a and 152a may have windows positioned to face only the stop positions of the levers 153a and 156a.

Figure 16:
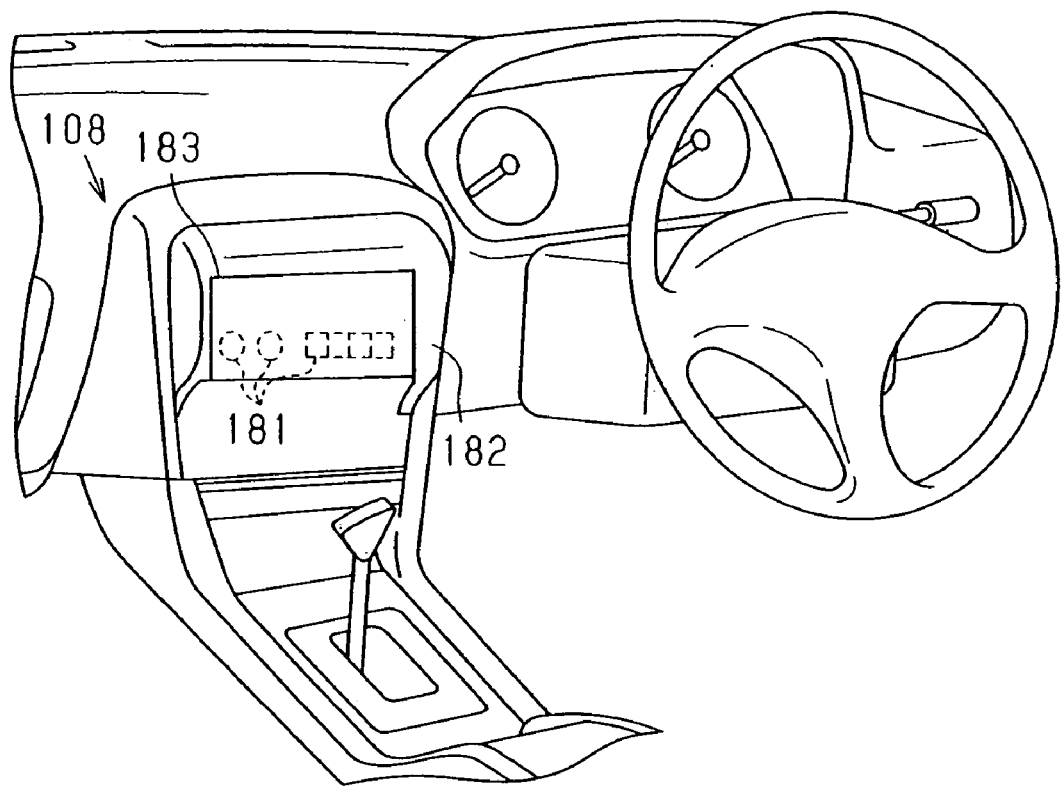
FIG. 16 is a perspective view showing a vehicle switch apparatus according to a further embodiment of the present invention.

The switch apparatuses of the present invention may be arranged at various positions in the vehicle. For example, as shown in FIG. 16, a switch apparatus 108 includes a plurality of switch operation portions 181 and a cover 182. The switch operation portions 181 are arranged on the center of the instrument panel. The cover 182 covers the operation portions 181. The switch apparatus 108 includes a window 183, which is arranged on the cover 182 and enables the driver to visually check operation of the operation portions 181.

In the first, second, fourth, and fifth embodiments, the windows 116, 126, 154, 157, 226, and 252 are made of translucent synthetic resin or glass. However, the windows may be formed from any material that enables the driver to visually check operation of the operation portions or the touch switches. For example, the switch apparatus may include a half mirror window, which is arranged on a cover, and a light source, which is arranged on the rear side of the half mirror window (the side of the window opposite to the driver). In this structure, the driver is able to visually check operation of the operation portions or the touch switches through the window, when the window is illuminated by the light source from its rear side. The cover may be made of metal. In this case, when the cover is not illuminated from its rear side, the window is indistinctive. This improves the luxurious appeal of the interior of the vehicle.

In the first and second embodiment, switches may additionally be arranged on the front side of the paddles 115, 125, 151a, and 152a.

In the first and second embodiments, the push switches 111 and 121 and the lever switches 153 and 156 are arranged on the rear side of the paddles 115, 125, 151a, and 152a. However, touch panel switches may be used instead of the push switches and the lever switches.

In the third embodiment, the door switch 107 includes the push switch 172 for opening the door. However, the door switch may include a toggle switch or a seesaw switch instead of the push switch.

Figure 17A:
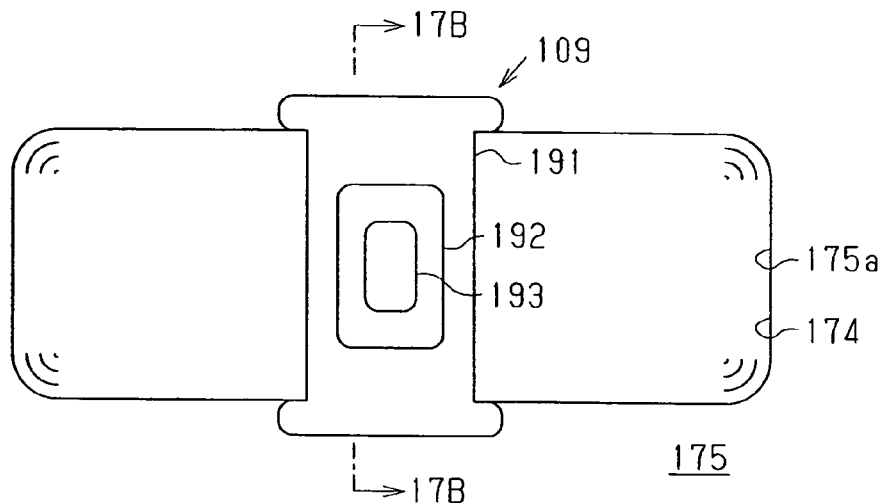
FIG. 17A is a front view showing a vehicle switch apparatus according to another embodiment of the present invention.
Figure 17B:
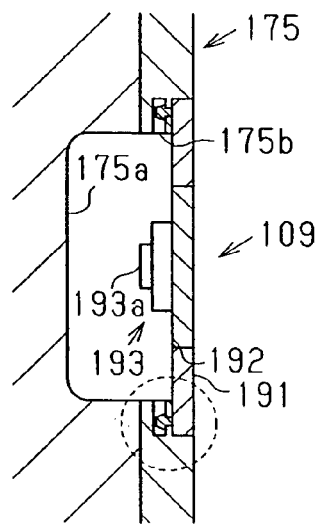
FIG. 17B is a cross-sectional view of the vehicle switch apparatus of FIG. 17A taken along line 17B—17B of FIG. 17A.

In the third embodiment, the door switch 107 is fixed in the opening 175b of the vehicle door 175. Alternatively, a door switch unit may be fitted in the opening 175b of the vehicle door 175. For example, as shown in FIG. 17A, a door switch 109 may be attached to the vehicle door 175. The door switch 109 includes a cover 191, a window 192, and a push switch 193. The window 192 is arranged on the cover 191. The push switch 193 is arranged on the rear surface of the window 192. The push switch 193 includes an operation portion 193a, which projects in the direction opposite to the driver. As shown in FIG. 17B, the upper and lower end portions of the door switch 109 are fixed to the vehicle door 175. As shown in FIG. 17C, a joint clip 191a is arranged on each of the upper and lower end portions of the door switch 109, and an engagement part 175c is formed in the opening 175b. The joint clip 191a is engaged in the engagement part 175c so that the door switch 109 is fixed in the opening 175b. In this way, the door switch 109 is easily attached in the opening 175b of the vehicle door 175. Thus, the door switch 109 may easily be replaced.

Figure 17D:
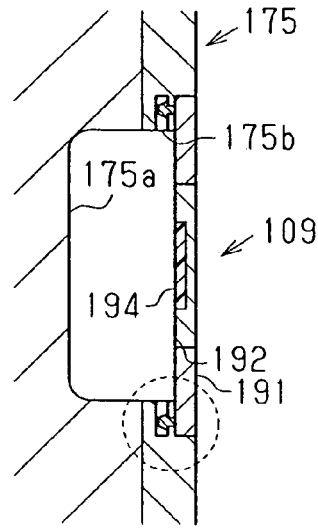
FIG. 17D is a cross-sectional view of a modification of the vehicle switch apparatus shown in FIG. 17A taken along line 17B—17B of FIG. 17A.
Figure 17C:
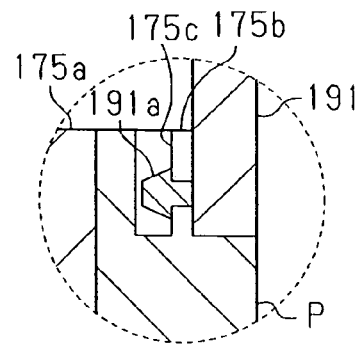
FIG. 17C is a partially enlarged view of the vehicle switch apparatus of FIG. 17B.

As shown in FIG. 17D, the door switch 109 may include a touch switch 194 instead of the push switch 193.

Figure 18A:
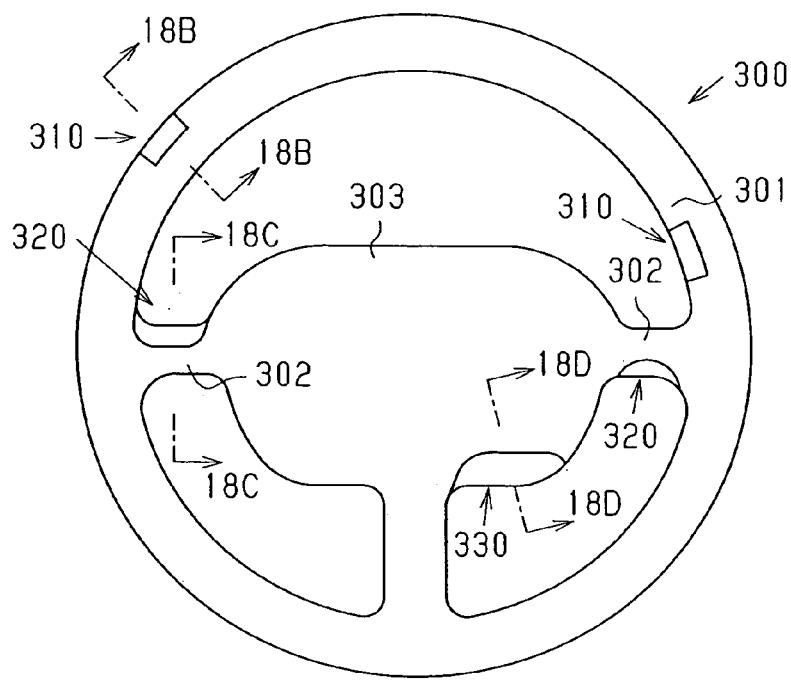
FIG. 18A is a front view showing vehicle switch apparatuses according to still another embodiment of the present invention.
Figure 18B:
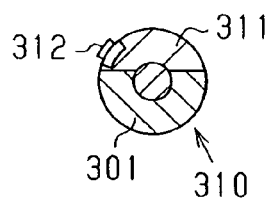
FIG. 18B is a cross-sectional view of the vehicle switch apparatus shown in FIG. 18A taken along line 18B—18B of FIG. 18A.

The vehicle switch apparatuses of the present invention may be arranged at various positions near the steering wheel of a vehicle. For example, as shown in FIG. 18A, a switch apparatus 310 may be arranged on the rim 301 of a steering wheel 300, a switch apparatus 320 may be arranged on a spoke 302 of the steering wheel 300, and a switch apparatus 330 may be arranged on a pad 303 of the steering wheel 300. As shown in FIG. 18B, the switch apparatus 310 includes a window 311 (viewer) arranged on the rim 301 and a push switch operation portion 312 arranged on the surface of the window 311 opposite to the driver. As shown in FIG. 18C, the switch apparatus 320 includes a window 321 (viewer) arranged on the spoke 302 and a push switch operation portion 322 arranged on the surface of the window 321 opposite to the driver. As shown in FIG. 18D, the switch apparatus 330 includes a window 331 (viewer) arranged on the pad 303 and a push switch operation portion 332 arranged on the surface of the window 331 opposite to the driver.

Figure 18E:
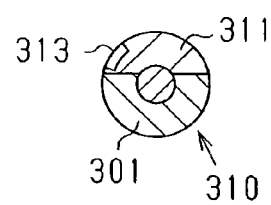
FIG. 18E is a cross-sectional view of a modification of the vehicle switch apparatus shown in FIG. 18A taken along line 18B—18B of FIG. 18A.
Figure 18C:
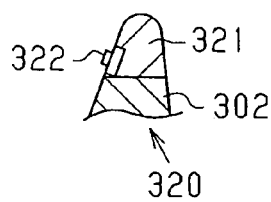
FIG. 18C is a cross-sectional view of the vehicle switch apparatus shown in FIG. 18A taken along line 18C—18C of FIG. 18A.
Figure 18F:
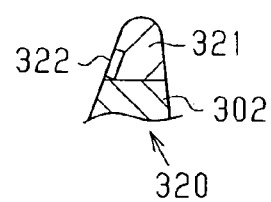
FIG. 18F is a cross-sectional view of a modification of the vehicle switch apparatus shown in FIG. 18A taken along line 18C—18C of FIG. 18A.
Figure 18D:
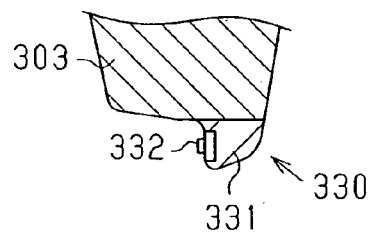
FIG. 18D is a cross-sectional view of the vehicle switch apparatus shown in FIG. 18A taken along line 18D—18D of FIG. 18A.
Figure 18G:
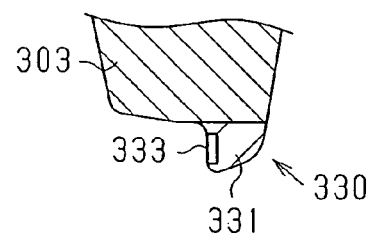
FIG. 18G is a cross-sectional view of a modification of the vehicle switch apparatus shown in FIG. 18A taken along line 18D—18D of FIG. 18A.

As shown in FIG. 18E, the switch apparatus 310 may include a touch switch 313 instead of the push switch. As shown in FIG. 18F, the switch apparatus 320 may include a touch switch 323 instead of the push switch. As shown in FIG. 18G, the switch apparatus 330 may include a touch switch 333 instead of the push switch.

In the fourth embodiment, the touch switches 214 and 224 are arranged so that their surfaces (touch surfaces) are flush with the surfaces of the main bodies 213 and 223. However, the present invention should not be limited to such an arrangement of the touch switches 214 and 224. The touch switches 214 and 224 may be arranged so that their touch surfaces are higher than the surfaces of the main bodies 213 and 223. Alternatively, the touch switches 214 and 224 may be arranged so that their touch surfaces are lower than the surfaces of the main bodies 213 and 223. With these structures, steps are provided between the touch surfaces of the touch switches 214 and 222 and the surfaces of the main bodies 213 and 223. The driver is able to easily check the position of the touch switches 214 and 224 by touching the steps. Thus, the driver is able to check operation of the touch switches 214 and 224 by both touching and viewing the operation to further improve operation reliability of the touch switches 214 and 224.

In the fifth embodiment, the exposed portion 253a of the touch switch 253 does not have to be flush with the rear surface of the window 252. In the sixth embodiment, the touch switch 272 does not have to be flush with the rear surface of the cover 271.

In the fifth embodiment, the switch apparatus 205 is arranged only at the right side of the column 104. Alternatively, the switch apparatus 205 may be arranged at the left side of the column 104 or switch apparatuses may be arranged at both left and right sides of the column 104. Further, the switch apparatus 205 may include not only a turn signal switch, but also, for example, a front light switch and a wiper switch.

In the fifth embodiment, the length of the lever switch 251 is set so that the distal portion of the switch apparatus 205 (the window 252 and the touch switch 253) is arranged outside the steering wheel 103. Alternatively, the length of the lever switch 251 may be set so that the distal portion of the switch apparatus 205 (the window 252 and the touch switch 253) is arranged inside the steering wheel 103. When the distal portion of the switch apparatus 205 is hidden by the steering wheel 103, the steering wheel 103 is to be formed as transparent or translucent.

In the fifth embodiment, the switch apparatus 205, which is a combination switch, is arranged on the column 104. The switch apparatuses 201 and 202 of the fourth embodiment, which are paddle switches, may be arranged between the switch apparatus 205 and the steering wheel 103. When the distal portion of the switch apparatus 205, which is a combination switch, is arranged inside the steering wheel 103, the paddles 215 and 225 and the main bodies 213 and 223 of the switch apparatuses 201 and 202 include windows 116 and 226 having a light transmission property to enable the driver to visually check the switch apparatus 205.

In the fourth to sixth embodiments, the touch switches 214, 224, 253, and 272 output a detection signal when simply touched by the finger H. Alternatively, the touch switches may output a detection signal when a predetermined threshold pressure, which is set in advance, is applied to the touch switches. The touch switches may output a detection signal when touched a plurality of times. With such structures, the touch switches do not output a detection signal when erroneously touched. This prevents the touch switches from being erroneously operated.

In the fourth to sixth embodiments, the touch switches 214, 224, 253, and 272 are transparent or translucent. The outer frames of the touch switches 214, 224, 253, and 272 may be colored. Alternatively, the touch switches may be entirely colored. In the fifth embodiment, the outer frame of the touch switch 253 may be colored differently from the lever switch 251. In this case, the touch switch 253 is more distinctive to the driver. In the sixth embodiment, the outer frame of the touch switch 272 may be colored differently from the cover 271. In this case, the touch switch 272 is more distinctive to the driver.

In the fourth embodiment, the touch switches 214 and 224 are arranged in the main bodies 213 and 223. Alternatively, the touch switches may be arranged on the rear surfaces of the windows 116 and 226. For example, the first to fifth touch switches 214a to 214e and 224a to 224e may be arranged at positions corresponding to the rear side (the side opposite to the driver) of the symbols on the first to fifth window sections 116a to 116e and 226a to 226e. This enables the driver to view his or her finger through the window when extending a finger to one of the first to fifth touch switches 214a to 214e and 224a to 224e. With the touch switch being arranged on the rear surface of the window, the driver does not have to extend his or her finger any further to operate the touch switch. This further improves convenience for the driver operating the touch switch. Also, with the touch switch being arranged on the rear surface of the window, dead space in the vehicle is effectively used. This increases a space for arranging other switches.

The first to fifth touch switches 214a to 214e and 224a to 224e arranged on the rear surfaces of the first to fifth window sections 116a to 116e and 226a to 226e may be colored when the sensors 118 and 128 detect approach of a finger. This structure enables the touch switches to be more distinctive to the driver and improves the operation reliability of the touch switches.

The present examples and embodiments are to be considered as illustrative and not restrictive, and the invention is not to be limited to the details given herein, but may be modified within the scope and equivalence of the appended claims.

What is claimed is:

1. A switch apparatus for use in a vehicle by an operator, the switch apparatus comprising:
   a cover having a front surface facing the operator and a rear surface opposite to the front surface;
   a lever switch including a lever that is arranged adjacent to the rear surface of the cover and operated by a finger of the operator; and
   a translucent viewer arranged on part of the cover at a location facing the lever;
   a sensor arranged on the rear surface of the cover near the lever, for sensing the finger approaching the lever; and
   a light source for illuminating the lever when the sensor senses the finger,
   wherein the translucent viewer enables the operator to visually check operation of the lever by the finger through the translucent viewer.

2. The switch apparatus according to claim 1, wherein the lever has a surface that reflects light.

* * * * *